Figure 1:
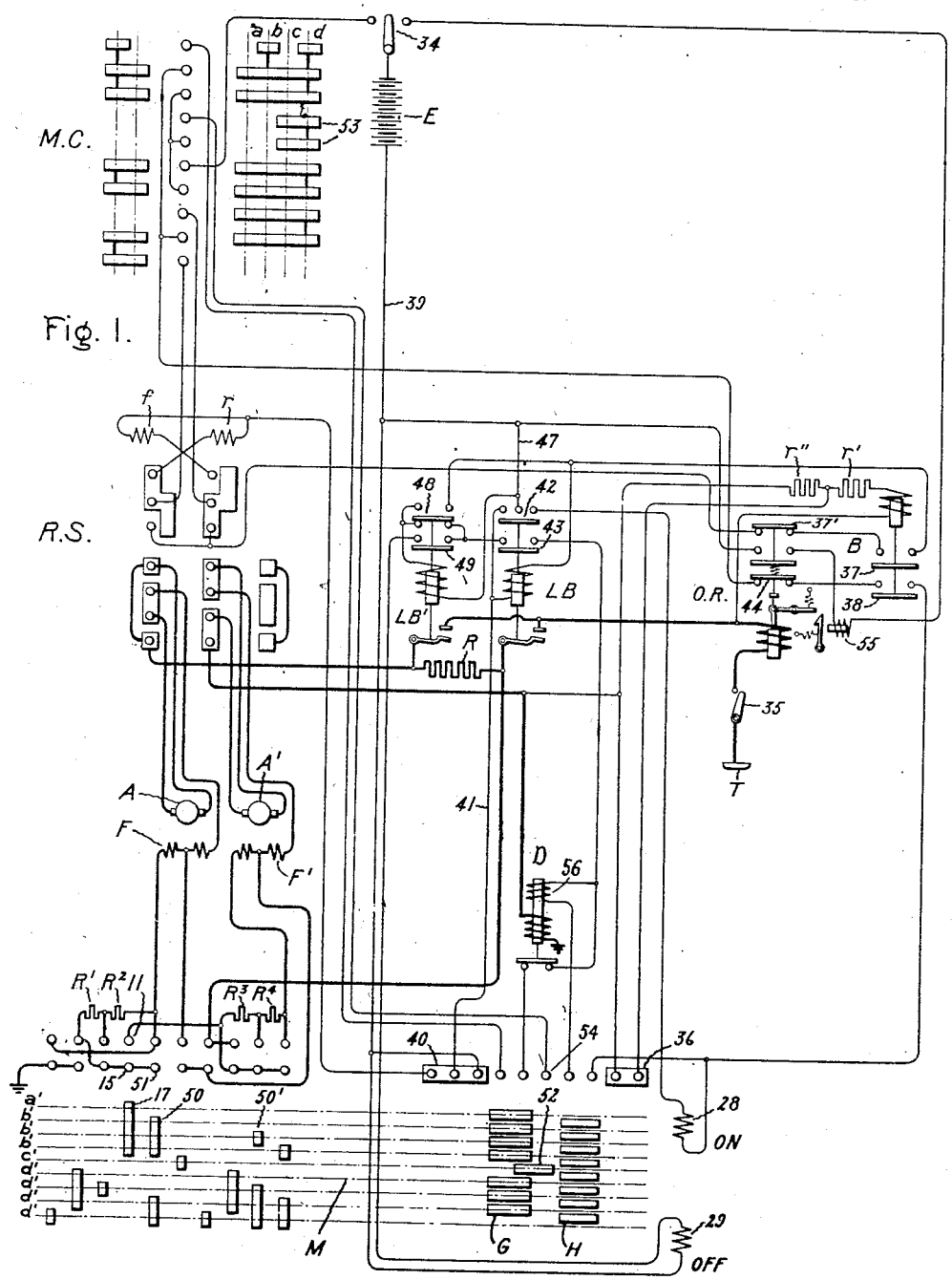

J. F. TRITLE.
SYSTEM OF MOTOR CONTROL.
APPLICATION FILED JUNE 20, 1916.

1,310,040.

Patented July 15, 1919.
2 SHEETS—SHEET 2.

Inventor
John F. Tritle,
by Albert G. Davis
His Attorney.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

SYSTEM OF MOTOR CONTROL.

1,310,040. Specification of Letters Patent. Patented July 15, 1919.

Application filed June 20, 1916. Serial No. 104,721.

*To all whom it may concern:*

Be it known that I, JOHN F. TRITLE, a citizen of the United States, residing at Schenectady, county of Schenectady, State of New York, have invented certain new and useful Improvements in Systems of Motor Control, of which the following is a specification.

This invention relates to the control of electric motors and has for its object the provision of improved means whereby electric motors are started, stopped and generally controlled in a simple, reliable and efficient manner.

While my invention is capable of general application in the motor control field, it is of particular importance in the control of electric railway motors.

In an application of Frank E. Case, Serial No. 33,496, filed June 11, 1915, patented April 3, 1917, No. 1,221,676, an improved system of motor control is disclosed in which the switches for making the various changes in the motor circuit are forced to operate in a predetermined order by mechanical means, thus providing a control which has advantages because of its light weight, and which obviates the complications which are inherent in a system employing electromagnetic switches or contactors having interlocks for bringing about the required order of progression of the contactors. In the said application of Frank E. Case, which shows and describes my invention, but makes no claim thereto, a control system for electric motors is provided, in which a plurality of unit switches make the various motor connections in a series-parallel control system, and these unit switches are forced to close against a spring tension by means of cams which in turn are operated by a main controller which is under the control of a master controller. The motor for advancing the main controller in a step by step manner to make the various changes in the motor circuits is in that application an electro-pneumatic mechanism. In order to prevent the operator from accelerating the motors too quickly at starting, a current-limit relay with its coil in the main motor circuit is provided which governs the progression of the main electro-pneumatically operated controller, and prevents this controller from being moved from one circuit-closing position to the next in succession until the motor current at each position has dropped to a predetermined value.

One of the objects of my invention is to provide a system in which the controller which makes the changes in the motor circuits will take a complete step from one circuit-closing position to the next in succession, although it is under the control of the current-limit device at the beginning of movement.

Without such an arrangement as I provide, if the current-limit device should operate after the main controller had begun its movement from one of the operative positions to the next in succession, or in case the operator moved the master controller one step forward and then before the main controller had completed its movement, he moved the master controller backward one step, the main controller would be left in a mid position between the proper operative positions and thus destructive arcing would be caused at the main controller contacts, but the operation of the main controller would not be sufficient to complete a proper operating circuit for the motors. I provide a current-limit means whereby the main controller, which may be advanced step by step by any suitable means, cannot be moved from one operative position to the next in succession until the motor current has dropped to a predetermined value, the arrangement being such that after the motor current has dropped to the predetermined value, and the operator has moved the master controller forward one notch, the main controller will be positively moved from the one operative position to the next even though the motor current should rise above the predetermined value or the operator should move the master controller backward one step while the main controller is taking the step. More specifically, my invention provides a main motor operated controller, the step by step advance of which is under the control of a current-limit relay and which has contacts thereon for short-circuiting the current-limit relay contacts so as to render the current-limit relay ineffective to stop the motion of the main motor operated controller after it has begun its movement from one operative position to the next in succession in response to the movement of the master controller. The movement of the main controller, which makes the changes in the motor circuit, is thus independent of the current-limit relay after having started to move from one position to the next, and the movement must be completed even though the current-limit relay should operate in the interval between positions. Other features of my invention will appear in the course of the following specification in which I have disclosed my invention embodied in a concrete form for purposes of illustration.

Figure 2:
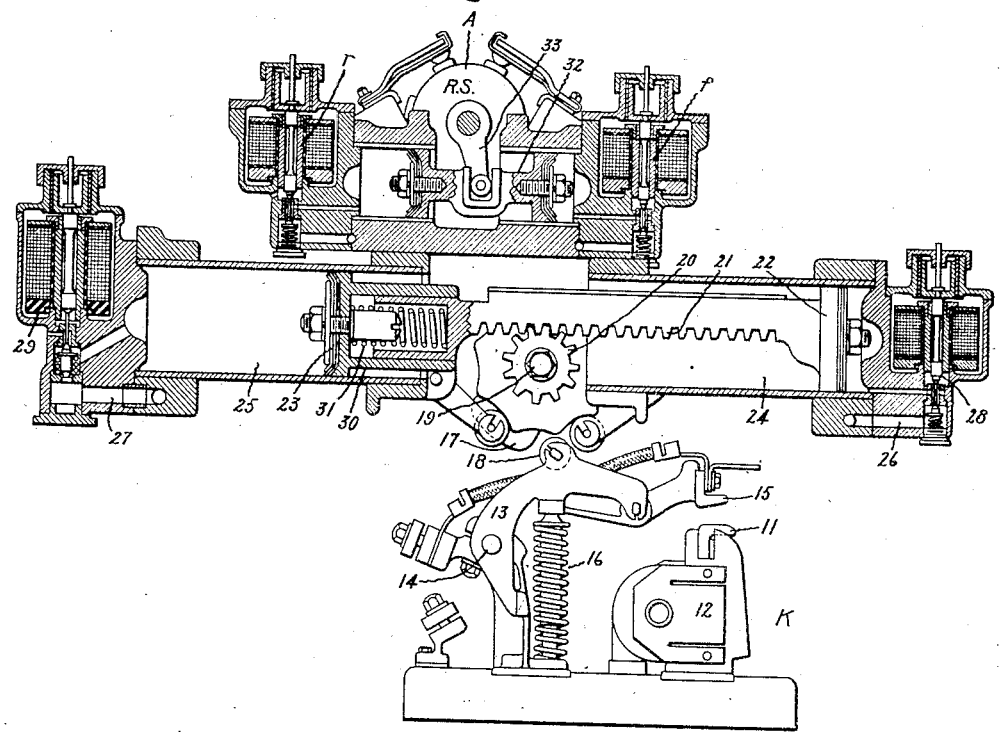
Figure 3:
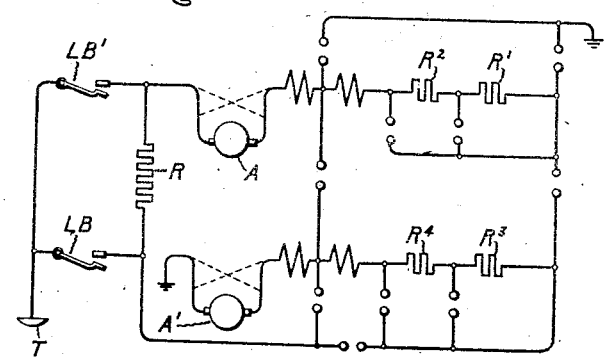

In the accompanying drawings illustrating my invention, Figure 1 is a diagram of a complete motor control system embodying my improvements; Fig. 2 is a sectional view of the electro-pneumatic means for operating the unit switches, and Fig. 3 is a simplified diagram showing only the motor circuits.

I shall first describe a system of control embodying my improvements as a whole, and shall then point out more in detail the specific features of my invention.

Looking first at Fig. 1, it will be noted that I have shown a series-parallel system of motor control in which two motors are employed. It will be understood, however, that my invention is in no sense limited to the particular system employed or to the number of motors controlled. The armatures of the two motors are designated A and A' while the fields which are subdivided as hereinafter described are designated F and F'. RS designates the reversing switch as a whole, MC indicates the master controller, and LB and LB' represent the two line breakers. B represents a potential relay which is deënergized so as to return the controller to the off position upon the failure of power. OR represents an overload relay, D represents a current-limit relay or throttle, for causing the advance of the main controller to be under the control of the motor current and E represents a battery for energizing the control circuits.

The main controller, which I have designated M, as shown in Fig. 1, consists of a number of cams arranged upon a shaft so as to close the contactors in a predetermined order. Forming a part of the controller and rotated with the cam shaft are two sets of contacts G and H, the purpose of which will be hereinafter described.

The main controller comprises a number of unit switches, one of which is shown at K (Fig. 2), which switches are operated electro-pneumatically. Each switch consists of an insulating base upon which is mounted a stationary contact 11, having a magnetic blowout 12, adjacent thereto, and a contact arm 13 pivoted at 14 and having a contact 15 at its end, coöperating with the stationary contact. The contact arm 13 is normally held in open position by spring 16 as shown in the drawing and is closed by engagement with one of the cam surfaces 17 with a roller 18 on the arm. As before stated, the cams, one of which is shown at 17, are arranged around a shaft 19 and longitudinally thereof, as shown in Fig. 1. The cam surfaces have the proper lengths, as indicated in Fig. 1, to maintain the switches closed for a proper interval. The cam shaft 19 is rotated through the pinion 20 by a pneumatic motor comprising a rack 21 having a piston at each end. These pistons 22 and 23 operate in cylinders 24 and 25 respectively, to which compressed air is admitted through the ports 26 and 27 respectively. The port 26 is normally closed to reservoir and open to atmosphere by the electromagnetically-operated valve 28 and is opened by the energization of the magnetizing winding of the valve, while the port 27 is controlled by the normally open electromagnetically-operated valve 29. This latter valve is closed when the magnetizing winding is energized. The valve 28, which as above stated is normally closed, connects the cylinder to atmosphere when the winding is deënergized, but, when the winding is energized, connects the port 26 with the air reservoir so as to admit compressed air to the cylinder 24 so as to move the piston 22 to the left. The valve 29 which is normally open controls the passage from the reservoir to the cylinder so that in the normal position of the valve, with the magnetizing winding deënergized, there will be full reservoir pressure in the cylinder 25. When, therefore, the magnetizing winding of the valve 28 is energized, compressed air will be admitted to cylinder 24 for moving piston 22 to the left, this being the movement which turns the cam shaft in the "on" direction, that is, to operate the proper switches to bring the motors up to speed. This movement will not take place, however, (except as to the first step as hereinafter described) unless the pressure is exhausted from the cylinder 25 by the operation of the valve 29 which closes the connection between the cylinder and the reservoir, and opens the connection between the cylinder and atmosphere. When, however, the valve 29 is opened by the deënergization of its winding, full reservoir pressure is admitted to the cylinder 25 so that the pressure on the two pistons 22 and 23 will be balanced. Therefore when the magnetizing winding of the valve 28 is energized, and the magnetizing winding of the valve 29 is deënergized, there will be no movement of the cam shaft (except on the first step). Moreover, if while the valve 28 is open and the cam shaft is being moved to the "on" position by the piston 22, the valve 29 should be opened, the movement of the cam shaft will be immediately stopped.

It will be noted that while the piston 22 is fixedly connected to the rack 21, the piston 23 is not so connected with the rack but is yieldingly mounted with respect to the rack. The piston 23 has attached to it a sleeve 30 which fits over the hollowed end of the rack 21, and a spring 31 fits into the hollowed end of the rack and presses against the inner side of the piston. This arrangement permits movement of the rack to the left so as to compress the spring 31 while the piston 23 remains stationary. In other words, when working pressure is applied to the piston 22, while there is working pressure on the piston 23, the piston 22 will move forward until the spring 31 is fully compressed. This movement causes the cam shaft to move one step to close the motor circuit as will hereinafter appear.

On the top of the cylinder casing is the reverse switch RS comprising a drum A and means for operating the same. The drum is operated pneumatically by means of a double acting piston 32 connected with the cylinder by arm 33. The movement to make the "forward" connections for the motors is controlled by electromagnetic valve $f$, while the movement in the direction to connect the motors for reverse operation is controlled by electromagnetic valve $r$. The construction of this reversing switch forms no part of my invention and need not therefore be described in further detail. The valves $f$ and $r$ are of substantially the same character as the valves 28 and 29 and in fact may be of any well known design.

I shall now return to Fig. 1 and describe the operation of the system as a whole. As shown, all the parts are in the positions which they assume when all circuits are de-energized. Assuming now that it is desired to start the motors, the switches 34 and 35 are first closed, switch 34 being closed on its left-hand contact. The closure of the switch 35 energizes the potential relay B having contacts 37 and 38 from the trolley T to the winding of the relay, through resistance $r'$ to bridging contact 36 on the main controller, and thence to ground. If, now, the master controller MC is moved to the first position, $a$, the reversing switch will be operated by the energization of the electromagnetic valve $f$ in case the reverser should be in the wrong position. As shown, however, the reverser has been left in the forward position so that there is no change with reference to this switch. The line breaker LB now closes, being energized from the battery, through the conductor 39, the contact 40 on the main controller, conductor 41, contact 37 on the potential relay and contact 37' on the overload relay, through contacts on the reversing switch and the master controller back to the battery. The line breaker therefore closes but does not close the motor circuit. The line breaker is provided with two interlocking contacts 42 and 43. The closing of the contact 42 by the closing of the line breaker energizes the magnetizing winding of electromagnetic valve 28, which I shall call the "on" magnet, the circuit being from the battery through the interlocking contact 40 through interlocking contact 42, thence through interlocking contacts 38 and 44, back to the battery through the master controller. The energization of the "on" magnet while the "off" magnet valve 29 is de-energized, causes the cam shaft to move one step by compressing the spring 31 while the piston 21 is held stationary by the pressure against it in a manner previously described. This has the effect of closing the contacts 11 and 15 through the agency of the cam 17. The motor circuit will now be closed from the trolley T through the switch 35 and the winding of overload relay OR, the contacts of line breaker LB, through resistance R, through the contacts on the reversing switch RS, armature A, two sections of field winding F, through the resistance $R'$, $R^2$, contacts 11 and 15, resistances $R^3$ and $R^4$, through the two sections of field winding $F'$ and the contacts on the reversing switch, armature $A'$, thence to the throttle or relay D and to ground. The closing of the motor circuit therefore is effected at the contacts 11 and 15 of one of the unit switches. The motors will now run in series with all the resistance in circuit.

When the master controller is moved to position $b$, the line breaker LB' will be closed; the circuit being from the battery, through wire 47, interlocking contact 48, interlocking contact 43 on line breaker LB, through the contacts controlled by the throttle magnet D and through one of the contacts G on the main controller, thence to the master controller and back to the battery. Line breaker LB' will therefore close and short-circuit the resistance R and in closing energize the "off" magnet of the electromagnetic valve 29, through the contacts 49. The energization of the "off" magnet causes the cylinder 25 to be exhausted to atmosphere so that the two pistons 23 and 22 move forward causing the cam shaft to move a second step and the cam 50 to close the contacts 51, and short-circuit the two sections of resistance R' and $R^2$. The invention thus far described forms no part of my invention but is the invention of Frank E. Case and forms part of his application above referred to.

I shall now describe my invention in detail. It is to be here noted that the pneumatic operating means of the Frank E. Case application above referred to has been chosen for the purposes of illustration and is my preferred form of motor, but any suitable means may be used for advancing the main controller step by step to make the various changes in the motor circuits.

Upon the cutting out of each of the resistance sections R, R' and R², the motor current rises so that the throttle D will open its contacts to prevent the controller being moved another step until the current drops to proper value. It will be noted that when the controller starts to take a step, it will complete the step notwithstanding the fact that the throttle contacts through which the "off" magnet was energized are opened before the completion of the step. This is accomplished by the arrangement of contacts G and H which rotate with the cam shaft. The "off" magnet is energized through one of the contacts G and the throttle contacts but as soon as the controller has started, circuit is made for the "off" magnet independently of the throttle contacts through one of the contacts H. This makes a circuit in parallel with the circuit through the throttle contacts, this parallel circuit being through contacts 38 and 44 on the potential relay B and overload relay OR respectively. The coil 56 is included in this circuit to assist the series coil and make the throttle more sensitive to changes of current. It is advisable that the advance of the controller be momentarily retarded at each operative position so as to prevent too rapid acceleration and prevent the controller moving through an operative position and causing a heavy rush of current at the next operative position. To take care of this, I insure that the current limit throttle will open its contacts while the controller is moving from one step to another during acceleration. The shunt coil 56 will positively pick up the throttle D during the transition from one step to another, and then the throttle will close after the step is completed, responsively to the motor current. Furthermore, by means of this coil 56 the throttle D need only be calibrated for its drop out value, since it is positively picked up during the transition from one step to the other. The throttle may therefore open, but the movement of the cam shaft will not be interrupted until the circuit is interrupted at contact H and established on the second contact G, which, it will be observed, will be when the controller has completed a step to position b'. If, therefore, the current has not dropped to the proper value when the cam shaft has completed its step, it cannot take another step until the current does drop so as to energize the "off" magnet through the throttle contacts. When the current does drop to a proper value, the "off" magnet will again be energized to cause the cam shaft to take another step which short-circuits the resistance R³ through cam 50'. Again the throttle will prevent further movement of the controller until the current drops to proper value, whereupon another step will be taken by the cam shaft which will short-circuit the resistance R⁴. When the cam shaft moves to the next step (c' on the main controller) in which the fields of the motors are tapped to give increased speed, the progression will stop, by reason of the fact that one of the contacts G, marked 52, is offset from the others so as to interrupt the circuit of the "off" magnet through both sets of contacts G and H. In order to progress further, it is necessary for the master controller to be moved to position c in which the "off" magnet is energized through the contacts 53, on the master controller, and the contact 52 which engages with contact finger 54. The movement of the master controller to the position c, therefore, causes the cam shaft to take one step (to position c') which changes the motor connections from full series with tapped or weakened field, which is the highest speed position in series, to the parallel position. When this position is reached, the progression is stopped by reason of the fact that the contact 54 passes over the contact 52. In order to progress further, it is necessary that the master controller be moved to the position d, in which the "off" magnet will be again energized in the regular way and the cam shaft moved forward step by step in the manner above described under the control of the throttle, until the full parallel position is reached.

The main controller will be returned to the "off" position at any time by the deenergization of the "on" magnet controlling the electromagnetic valve 28. This will exhaust the cylinder 24 to atmosphere so that the pressure in cylinder 25 will move the rack 21 to the right and hence turn the controller back to "off" position. This deënergization of the "on" magnet to turn the controller will be accomplished by the deenergization of the potential relay B. If for instance, the power should fail, even for an instant, the potential relay will drop thereby deënergizing the "on" magnet at the contact 38 of the relay. It will be noted that this potential relay is energized through the contact 36 in the "off" position of the main controller, but that as soon as the controller moves from "off" position a holding circuit is made through a resistance r''. If, therefore, the potential relay should open, it can only be closed if the main controller is in the "off" position. The reverser RS is also interlocked with the main controller at contact 40 so that the valve magnets f and r can only be energized in the "off" position of the controller. The opening of the potential relay causes the opening of the line breaker LB which in turn causes the opening of the line breaker LB' and causes another break in the circuit of the "on" magnet so that the controller will be returned to "off" position. It will be understood of course, that at any time when the controller is advancing automatically under the control of the throttle, progression may be stopped at any operating position but not between positions by moving back one step on the master controller, which will deënergize the "off" magnet and balance the pressure in the two cylinders. For instance, if the master controller is in position *b* and the main controller is advancing to make the various connections in series, progression may be stopped by bringing the master controller back to the position *a*. Likewise if the master controller is in position *d* the automatic progression may be stopped by moving the master controller back to the position *c*. When the master controller is moved to the "off" position, the "on" magnet will be deënergized and the main controller returned to "off" position. Upon the occurrence of an overload, the overload relay OR will cause the motor circuit to be opened at the line breakers and stop the motors. This overload relay is of the reset type, that is, when it opens it is latched open. The line breakers cannot be closed until the overload relay is reset and then can only be closed by moving the switch 34 on to its right-hand contact which will energize the magnet 55 to release the latch and allow the relay to close the operating circuits of the line breakers.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. The combination with a controller for starting electric motors, of means for causing the controller to advance step by step under the control of the motor current, and means whereby the current control is rendered more sensitive only when the controller is being advanced from one step to the next and after a step is begun the advance of the controller is rendered independent of the motor current until the step is completed.

2. The combination with a controller for starting electric motors, of a current-limit device for causing a step by step advance of the controller under the control of the motor current, and means whereby the current limit device is rendered more sensitive only when the controller is being advanced from one step to the next and after a step is begun the advance of the controller is rendered independent of the current-limit device.

3. The combination with an electric motor and a controller therefor, of a current limit device for causing the controller to advance step by step under the control of the motor current, means for insuring the operation of the current limit device while the controller is moving from one operative position to the next, and means whereby after a step is begun the advance of the controller is rendered independent of the current limit device until the step is completed.

4. The combination with an electric motor and a controller therefor, of a current-limit device for causing the controller to advance step by step under the control of the motor current, a shunt coil for the current limit device, and means whereby the shunt coil is energized only during the transition from one step to the next and after a step is begun the advance of the controller is rendered independent of the motor current until the step is completed.

5. The combination with an electric motor and a controller therefor, of a current-limit relay for causing a step by step advance of the controller under the control of the motor current, a shunt coil for the current limit device and means including a short-circuit around the current-limit relay contacts and through the shunt coil whereby after the movement of the controller from one operative position to the next has begun the controller will take a complete step independently of the current-limit relay and the current limit relay rendered more sensitive during the transition from one step to another.

6. The combination with an electric motor and a controller therefor, of a current limit relay for causing a step by step advance of the controller under the control of the motor current, contacts on the controller for interrupting the circuit through the contacts on the current limit device at each step and additional contacts on the controller for short circuiting the contacts of the current limit device after a step has begun, so that the controller will take a complete step independently of the current limit relay.

7. The combination with a plurality of electric motors and a series parallel controller therefor, of a current limit relay for causing a step by step advance of the controller under the control of the motor current, contacts on the controller for interrupting the circuit through the contacts on the current limit relay at each step, additional contacts on the controller for short circuiting the contacts of the current limit device after a step has begun, so that the controller will take a complete step independently of the current limit relay, and means comprising a contact on the controller for interrupting the circuit through the contacts on the current limit device so that the advance of the controller is interrupted at the full series position.

8. Means for controlling electric motors comprising a main controller for the motor circuit, pneumatic operating means for advancing the main controller step by step, a master controller for controlling the pneumatic operating means, a current-limit device governing the operation of the pneumatic operating means for causing the advance of the main controller to be under the control of the motor current, and means whereby after the master controller has been moved a step forward and the pneumatic operating means has begun the movement of the main controller from one operative position to the next, the pneumatic operating means is rendered independent of the current-limit device until the main controller has taken a complete step.

9. Means for controlling electric motors comprising a main controller for the motor circuit, pneumatic operating means therefor, electromagnetically-actuated valves for controlling the main controller to cause it to advance step by step, a master controller for controlling the electromagnetically-operated valves, a current-limit relay for causing the advance of the main controller to be under the control of the motor current, an operating circuit for one of the electromagnets through a contact on the main controller and the contacts of the current-limit relay at each operative position of the main controller, and means comprising a contact on the main controller for short-circuiting the contacts of the current-limit relay after the master controller has been moved a step forward and the movement of the main controller from one operative position to the next has begun, whereby the electromagnetically-operated valves are independent of the current-limit relay until the main controller has taken a complete step.

In witness whereof, I have hereunto set my hand this 15th day of June, 1916.

JOHN F. TRITLE.